United States Patent [19]

Taylor

[11] Patent Number: 5,805,275
[45] Date of Patent: Sep. 8, 1998

[54] SCANNING OPTICAL RANGEFINDER

[75] Inventor: William H. Taylor, South Deerfield, Mass.

[73] Assignee: Kollmorgen Corporation, Northampton, N.Y.

[21] Appl. No.: 536,630

[22] Filed: Sep. 29, 1995

Related U.S. Application Data

[63] Continuation-in-part of Ser. No. 380,152, Jan. 30, 1995, abandoned, which is a continuation of Ser. No. 38,767, Apr. 8, 1993, abandoned.

[51] Int. Cl.$^6$ .............................. G01C 3/00; G01C 5/00; B60T 7/16
[52] U.S. Cl. .......................... 356/3.16; 359/202; 180/167
[58] Field of Search ................................. 356/4.01, 5.01, 356/5.1, 3.01–3.15; 180/169, 167; 359/202

[56] References Cited

U.S. PATENT DOCUMENTS

| | | |
|---|---|---|
| 4,236,819 | 12/1980 | Green . |
| 4,294,506 | 10/1981 | Hattori . |
| 4,333,368 | 6/1982 | Watt . |
| 4,538,181 | 8/1985 | Taylor . |
| 4,627,734 | 12/1986 | Rioux ...................................... 356/376 |
| 4,668,859 | 5/1987 | Winterer . |
| 4,721,384 | 1/1988 | Dietrich et al. . |
| 4,991,953 | 2/1991 | Pflibsen et al. .......................... 351/206 |
| 5,015,050 | 5/1991 | Itabashi . |
| 5,028,103 | 7/1991 | Fukasawa et al. . |
| 5,091,646 | 2/1992 | Taylor ..................................... 250/332 |
| 5,198,877 | 3/1993 | Schulz . |
| 5,231,470 | 7/1993 | Koch ...................................... 356/376 |

FOREIGN PATENT DOCUMENTS

| | | |
|---|---|---|
| 0619502 | 10/1994 | European Pat. Off. . |
| 1494885 | 9/1967 | France . |
| 2855830 | 6/1979 | Germany . |
| 4108057 | 9/1992 | Germany . |
| 1292876 | 10/1972 | United Kingdom . |
| 1514457 | 6/1978 | United Kingdom . |
| 2070879 | 9/1981 | United Kingdom . |
| 2101352 | 1/1983 | United Kingdom . |

OTHER PUBLICATIONS

W. J. Smith, McGraw–Hill; Modern Optical Engineering: The Design of Optical Systems; pp. 307–315; 1990.
D. Kessler et al; SPIE vol. 1079, High Resolution Laser Writter; pp. 27–35; 1989.
H.H. Taylor; Optics News; pp. 28–29; 1988.
R.E. Hopkins; Optics News; pp. 11–16, 1987.
S. Minami et al; Laser Focus Electro–Optics; pp. 98–106; 1987.
L. Beiser; Optics News; pp. 10–16; 1986.
L. Beiser; Laser Focus/Electro–Optics; pp. 88–96; 1985.
T. H. Jamieson; SPIE; vol. 518; Optical Systems Engineering VI; pp. 15–21, 1984.
W. Taylor; SPIE; vol. 518; Optical Systems Engineer IV; pp. 7–14; 1984.
J.C. Urbach et al; Proc. of IEEE; vol. 70; No. 6; pp. 597–618; 1982.
J.M. Fleischer et al; Laser–Optical System; pp. 479–483; 1977.
IBM Technical Discl. Bul.; vol. 31; No. 7, Dec. 1988; Armonk, N.Y.

*Primary Examiner*—Stephen C. Buczinski
*Attorney, Agent, or Firm*—Morgan & Finnegan, LLP

[57] ABSTRACT

A scanning optical rangefinder including an optical scanner and a light source. The optical scanner includes a rotating scan disc with a circular array of concave reflectors thereon. Mirrors are provided for directing light from the light source towards the concave reflectors on the rotating scan disc and then to direct light from the concave reflectors on the scan disc towards a target. Light received from the target is directed towards the concave reflectors on the scan disc by mirrors along a plurality of channels. A detector adapted to receive light reflected from the concave reflectors is provided for each channel, along with error correction for parallax data from the detector. The light is directed towards the target along a channel laterally displaced from a channel for light received from the target.

76 Claims, 8 Drawing Sheets

PRIOR ART

SCANNING OPTICAL RANGEFINDER

CROSS-REFERENCE TO RELATED APPLICATIONS

This application is a continuation-in-part of U.S. patent application Ser. No. 08/380,152, filed on Jan. 30, 1995, abandoned in the name of William H. Taylor which was a continuation of U.S. patent application Ser. No. 08/038,767, filed on Apr. 8, 1993, abandoned in the name of William H. Taylor.

BACKGROUND OF THE INVENTION

The invention relates to systems for providing range and lateral (horizontal and vertical) position data on targets. More particularly, the invention relates to systems for simultaneously providing range and lateral position data on targets for collision avoidance. In addition, scene reflectance and emittance data may be acquired for each pixel and form the basis for creating an ordinary scene image in daytime or nighttime.

Typically, a target, or multiple targets, lies within a field of view which is rectangular in shape. The position of a target within the field of view may be defined by its angular coordinates, $\alpha$ and $\beta$, corresponding respectively to the azimuth (horizontal) and elevation (vertical) directions. In an extreme case, each image cell or pixel within the field of view lies at a different range. It is therefore desirable to create a "3D map" of a scene by assigning a range value to each pixel within the field of view.

There are different methods for obtaining this range information. One method is to use the principle of triangulation wherein the range of a target is derived from knowledge of the directions of the lines of sight from two viewing points to the target. This is a well known and widely used range finding technique for single targets. However, where multiple targets are spread over a large field of view, the complexity of the problem can become excessive, particularly if the "3-D map" must be created and analyzed quickly. A further problem is that a large field of view and high resolution requirements can dictate the use of an imaging detector with a prohibitively large size and large number of elements and high cost as shown below.

FIG. 7 illustrates the application of conventional range finding concepts to target location. A target is located at distance R from two viewing points separated by distance W and generates an angle $\delta$ in the case where the target lies on an axis that bisects the line connecting the two viewing points. If the angle $\delta$ can be measured and the distance W is known, then the range R is given by $$R = \frac{W}{\delta} \quad (1)$$

for small angles $\delta$, (e.g., less than 10°). For an off-axis target at angle $\alpha$, illustrated in FIG. 8, the range is given by $$R = \frac{W \cos \alpha}{\delta} \quad (2)$$

For off-axis angles of 15° or less, equation (1) is sufficient for greater than 95% accuracy.

Referring to FIG. 9, in order to resolve range differences a certain angular resolution db is required. This is related to range resolution dR by $$d\delta = \frac{W}{R^2} dR \quad (3)$$

Referring to FIG. 10 and again applying conventional rangefinding techniques, the two viewing points may comprise, for example, a pair of cameras employing CCD detector arrays of width $D_{cam}$ and detector element spacing d, each with its own lens and again separated by some distance W in order to produce the desired parallax angle $\delta$.

The two images from the cameras are compared and the relative displacement of the images is found by suitable image processing techniques such as are known in the art. Such image processing techniques are particularly described in *Digital Image Processing*, Second Edition, Gonzalez & Wintz (Addison Wesley, 1987). The displacement data is then used to determine the range.

It may be appreciated that the detector image format of the cameras must be large enough to encompass the entire field of view over which the ranging operation is required. The detector element size d, however, must also be small enough to yield the required range resolution. For example, if the field of view is 30°, the separation between the cameras 100 mm, and the range resolution is 1 meter, at a distance of 100 meters the detector array size $D_{cam}$ and detector element size d may be calculated:

$$\begin{aligned} d\delta &= \frac{W}{R^2} \partial R \\ &= \frac{0.1 \text{ m}}{(100 \text{ m})^2} \times 1 \text{ m} \\ &= 0.00001 \text{ radians} \end{aligned}$$

Assuming a CCD array detector for the camera in which the detector element separation is d, then the focal length $f$ of a camera lens required to achieve the angular resolution $d\delta=0.00001$ may be calculated as:

$$\begin{aligned} d\delta &= \frac{d}{f} \\ f &= \frac{d}{0.00001} \\ &= 10^5 \times d \end{aligned}$$

State of the art CCD array detectors yield d values near 0.015 mm. However, by signal processing the "effective d" may be assumed to be about one-half this value (i.e., $\delta_{eff}=0.0075$ mm). Then the focal length may be calculated:

$$\begin{aligned} f &= \frac{d}{\delta_{eff}} \\ &= \frac{0.0075 \text{ mm}}{0.00001} \\ &= 750 \text{ mm} \end{aligned}$$

The detector format total width is determined by the basic field of view, 30°, and the additional field of view generated by the parallax for the nearest range target. Assuming a nearest range target at approximately 3 meters, the additional field of view is calculated as $$\begin{aligned} \delta_{max} &= W/R_{nearest} \\ &= 0.1/3 \\ &= 0.033 \text{ radians} \end{aligned}$$

This is 1.90° or approximately 2°. Thus, the detector array width may be calculated as $$D_{cam} = f \tan \alpha + f \tan (\alpha + \delta_{max})$$
$$= 750 \tan 15° + 750 \tan (15° + 2°)$$
$$= 201 + 229$$
$$= 430 \text{ mm}$$

Using the detector element size of 0.015 mm, this yields a number of detector elements, N, for each detector array:

$$N = \frac{N_{cam}}{d}$$
$$= 430$$
$$= \frac{430}{0.015}$$
$$= 28,667 \text{ elements}$$

These calculations indicate fundamental problems with the conventional dual camera rangefinder concept. In particular, required detector arrays are much too large both in physical size and the number of elements for applications such as vehicle collision avoidance systems. Further, such detector arrays would also be prohibitively costly and two such arrays would be required for each vehicle collision avoidance system.

In triangulation type rangefinders, accuracy in the determination of the parallax between the two channels is critical to range resolution. Parallax inaccuracy arises in the polygonal and pyramidal mirror systems due to facet-to-facet angular deviations which arise in their manufacture. State-of-the-art in polygon facet angle manufacturing tolerances is of the order of ±10 microradians. The total deviation from one facet to the next can therefore be 40 microradians, and the resulting error in the direction of the line-of-sight, 80 microradians due to the doubling effect caused by the law of reflection. This gives rise to a range inaccuracy equal to 8 meters when ranging at 100 meters, a grossly intolerable error. The problem becomes correspondingly more severe when real world, low cost, production tolerances are applied to the polygon wedge angle tolerance. Thus, typical manufacturing errors routinely encountered in the manufacture of polygon mirror facet angles render ranging schemes based on the polygon either very inaccurate or prohibitively expensive to manufacture.

SUMMARY OF THE INVENTION

With the foregoing in mind, it is an object of the invention to provide a small compact scanning rangefinder which exhibits both large field of view and high range resolution.

It is a further object of the invention to provide a scanning optical rangefinder suitable for automobile and other vehicle collision avoidance applications wherein low cost, accuracy, reliability and ease of integration are important.

It is a further object of the invention to provide a scanning optical rangefinder which can yield a scene image on a vehicle dashboard display.

In one aspect, this invention relates to a scanning rangefinder including scanning elements, a radiation source, and a linear detector array and two apertures, one for the laser transmitter channel and the other for the laser receiver channel.

In the laser transmitter channel, light from a laser diode or other radiation source is transmitted to the target through scanning optics which provide horizontal and vertical field of view coverage. The radiation is transmitted from an aperture which is displaced laterally from the laser receiver aperture.

In the laser receiver channel, the light reflected from the target is collected through the second, laterally displaced aperture, which is dedicated to that function, and which shares the scanning optics used in the laser transmitter channel. In addition, separate collection and relay optics are employed to deliver the laser radiation to a linear detector array.

Since the transmitter and receiver channel apertures are laterally displaced, a parallax angle is created between the two channels whenever a target object is located at a distance from the rangefinder which is less than infinity. This parallax angle causes the location of the focused light spot in the receiver channel to be located on the linear detector array at a distance from the infinity range position which is inversely proportional to the range of the target. In accordance with the invention, the parallax created by a triangulation scheme with 100 mm separation between the apertures is only 0.000010 radians (10 microradians). This very small angular deviation may be buried in the deviations of the line of sight caused by the wedge errors in commercially viable polygonal or pyramidal mirror rangefinder systems.

In another aspect, this invention provides concurrently for the creation of the scene image over which the range data is being acquired. Scene pixel reflectance and/or thermal emittance radiation data is acquired during the rangefinder scanning process through the image channel of the device. This channel utilizes the aperture of the laser transmitter channel, the same scanning optics, and has separate, dedicated, fixed, detector input optics, and a detector. The detector can be a single element type or a small, cooled array to increase sensitivity, and can operate in various portions of the infrared and visible spectrums.

Another aspect of the invention is the means to obtain parallax data which is not corrupted by manufacturing errors in the scanning component. This is accomplished by sampling the transmitted laser radiation and injecting it directly into the receiver channel. This creates an infinity range light spot on the detector array which changes in position along the array in proportion to the magnitude of the scan component manufacturing error which is in effect at that instant. The return laser focused spot is identically displaced from its correct nominal position, also, but the difference in the locations of the infinity and near target focused light spots on the array is unchanged from the amount that would exist in an unperturbed system. The electrical signal output from the detector array corresponding to the difference in location of the light spots is then used to provide parallax data which is free of error.

The scanning optical rangefinder concept as described above can be implemented in a variety of ways. The two lines of sight may be scanned by a pair of oscillating flat mirrors as suggested in FIG. 1. Alternately, these two mirrors can be fixed and the inner pair can be rotated about a common axis. An extension of this is to convert the inner mirrors of FIG. 1 to polygons as shown in U.S. Pat. No. 4,627,734 to Rioux.

A particularly advantageous implementation of the scanning optical rangefinder employs a rotating disc scanner combined with a conical strip mirror and associated image forming optics. This scanner exhibits 100% scan efficiency, high speed potential, operates with reflective optics and can be compactly packaged. The mirrored surfaces of the optical scanner may be integrally formed with the housing of the scanning optical rangefinder and the scan disc drive may be combined with the drive for the vertical scan mirror. Along with the control electronics for the detector array, signal processing may be provided for thresholding, centroid location, and spurious signal rejection.

The scanning optical rangefinder according to the invention provides a system with high rangefinding accuracy, small system size, and low system cost via few and readily realizable manufactured components. The scanning optical rangefinder may be implemented in vehicles for collision avoidance and also used in applications such as traffic control and robotics.

BRIEF DESCRIPTION OF THE DRAWINGS

The accompanying drawings, referred to herein and constituting a part hereof, illustrate preferred embodiments of the invention and, together with the description, serve to explain the principles of the invention, wherein.

DETAILED DESCRIPTION OF THE DRAWINGS

Figure 1:
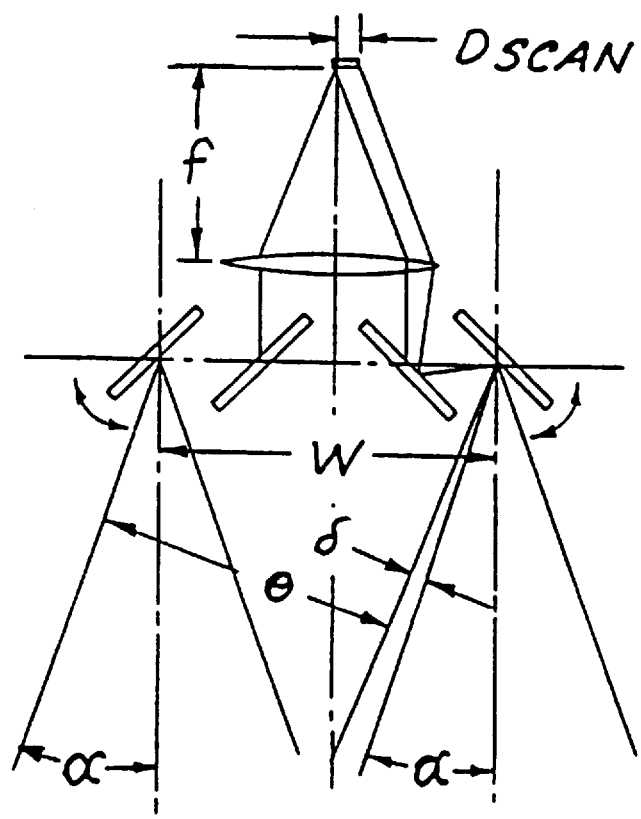
FIG. 1 is a diagramatic illustration of the operation of the basic form of the scanning optical rangefinder according to the invention.
Figure 2:
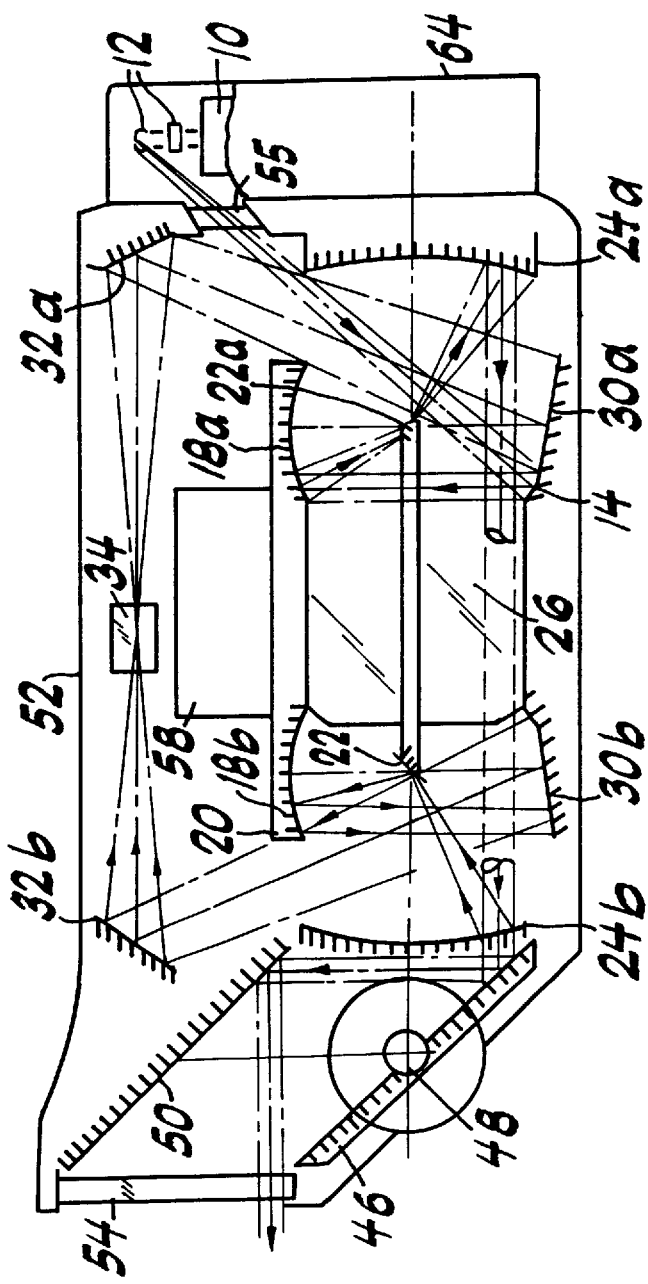
FIG. 2 is a side sectional view of the scanning optical rangefinder.
Figure 2A:
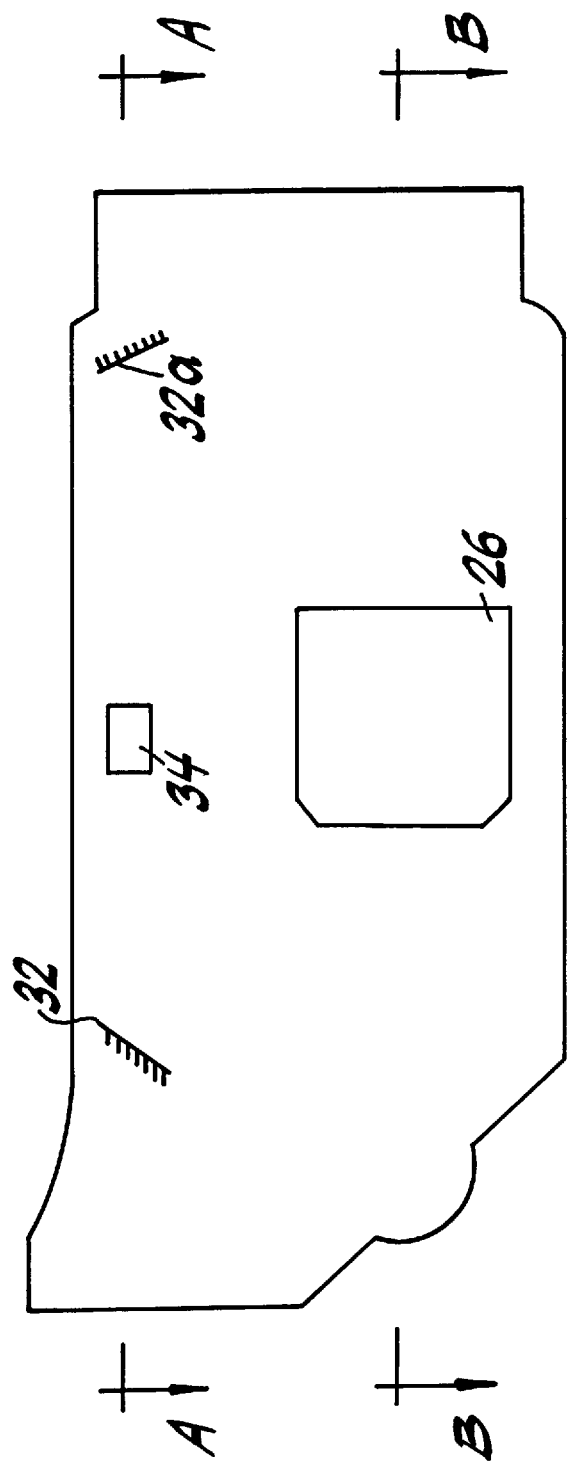
FIG. 2a is a view of the scanning optical rangefinder illustrating the relationship between FIGS. 2, 3, and 4.

FIG. 1 illustrates diagrammatically the principal of operation of the basic form of the scanning optical rangefinder according to the invention. Two lines of sight are simultaneously scanned in exact synchronization with each other by two synchronized oscillating mirrors. The lines of sight are separated by distance W as shown to give rise to parallax angle δ for any target located nearer than infinity. The nearer the target the larger is the angle δ. The incoming light from both channels is directed to a lens which forms an image of the pixel which is on the lines of sight. For distant targets the pixel is identical for both lines of sight and the first detector element of a linear detector array becomes activated equally by the light from each channel. For a near target, however, a difference in detector element activation occurs and this difference is inversely proportional to range. In order to isolate and differentiate the pixel which is on the line of sight, the pixel is illuminated by a narrow beam of light which is transmitted from one of the two channels concurrently with the scanning process, i.e., the light collection operation described above. With each line-of-sight addressing every pixel in a scene sequentially, the detector array need only be large enough to span the field of view created by the parallax. Thus, the total dimension of the array is determined by the parallax created by the nearest range target and is totally independent of the scanned field of view.

The total dimension of the detector array is given by:

$$\begin{aligned} D_{scan} &= f \tan \delta_{max} \\ &= 750 \tan 2° \\ &= 26.2 \text{ mm} \end{aligned}$$

and the total number of elements in the detector array, N, is given by $$\begin{aligned} N &= \frac{D_{scan}}{d} \\ &= \frac{26.2}{0.015} \\ &= 1747 \text{ elements} \end{aligned}$$

It may be appreciated that both the size and number of elements are achievable by techniques known in the art.

Figure 5:
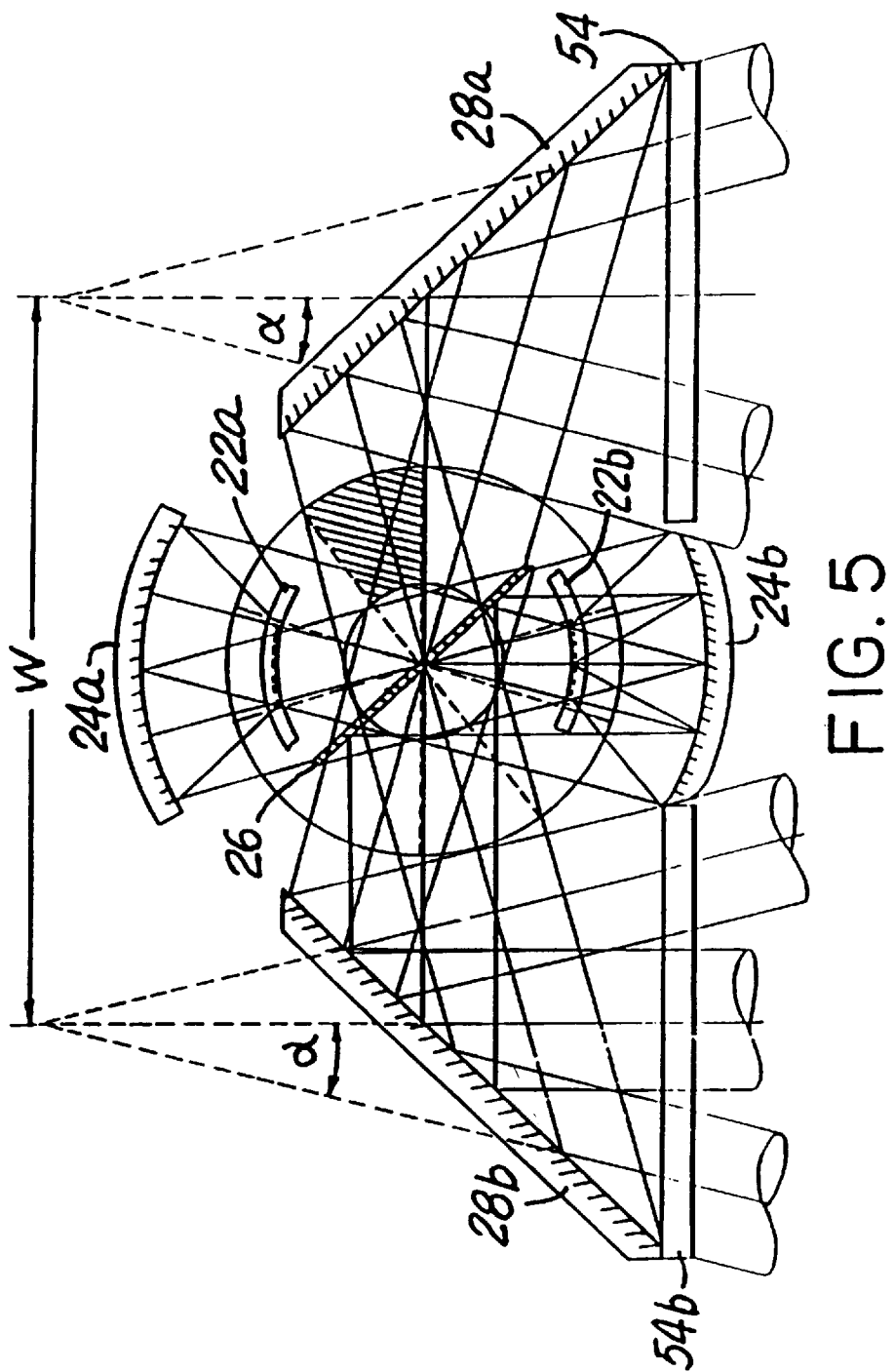
FIG. 5 is a diagramatic illustration of the ray bundles in the scanning optical rangefinder of FIG. 4.
Figure 6:
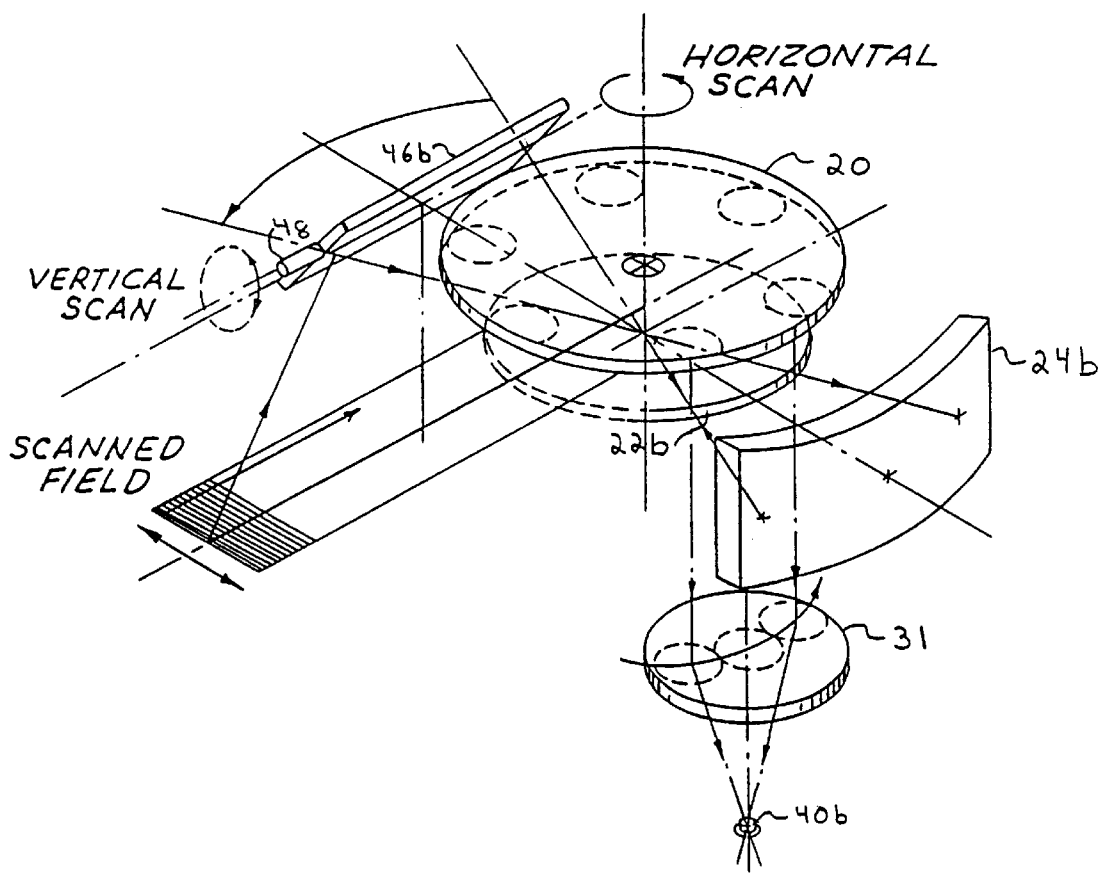
FIG. 6 is a perspective schematic of the CVROS optical scanner.
Figure 7:
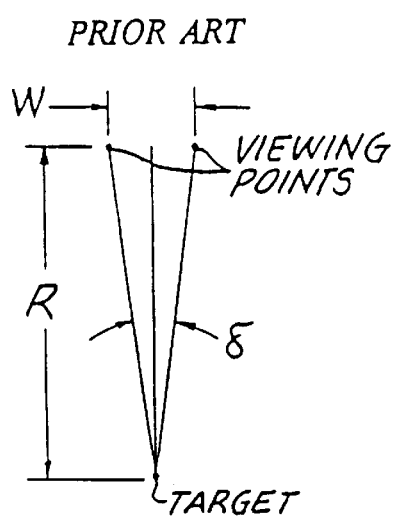
FIG. 7 is a diagrammatic illustration of conventional rangefinding techniques in target location.
Figure 8:
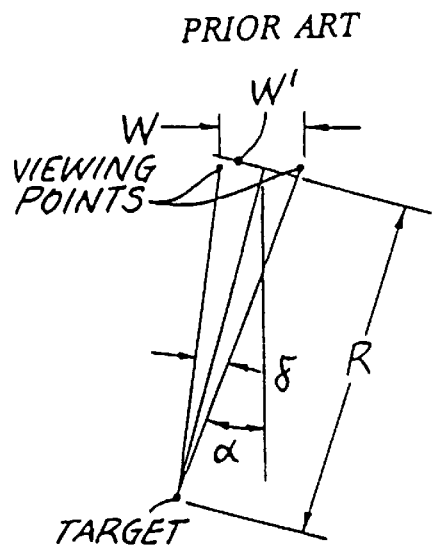
FIG. 8 is a diagrammatic illustration of conventional rangefinding techniques in target location for an off-axis target.
Figure 9:
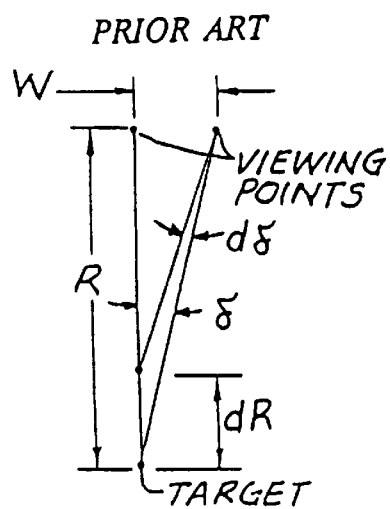
FIG. 9 is a diagrammatic illustration of angular resolution determination by conventional rangefinding techniques.
Figure 10:
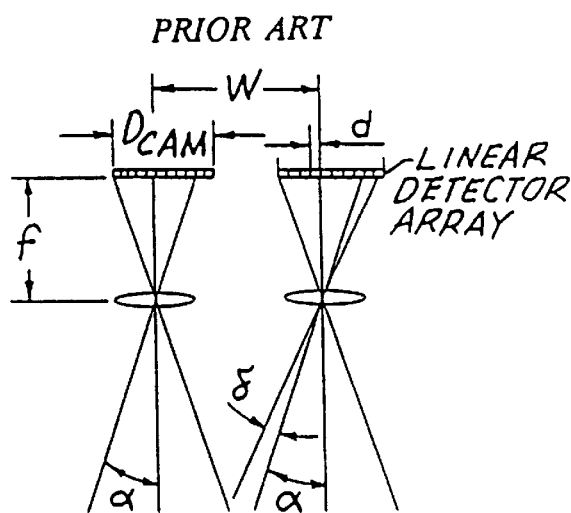
FIG. 10 is a diagrammatic illustration of detector sizing by conventional rangefinding techniques.

FIGS. 2–5 illustrate how the scanning optical rangefinder concept can be implemented by the compact video rate optical scanner (CVROS). This device is described in U.S. Pat. No. 4,538,181, the inventor being the same as the subject invention. FIG. 6, a perspective schematic of a general implementation of a CVROS scanner, is provided as an aid to understanding the present invention. In this schematic, collection mirror 30b is replaced by lens 31 and field lens 42 and relay optics 44 are omitted for clarity. These particular system elements will be discussed in detail below.

The CVROS implementation of the scanning optical rangefinder embodies all of the characteristics of the basic form described above. A laser beam is transmitted out of the scanner through one of the channels and illuminates each pixel in the field of view in a sequential manner. The reflected light from each of the pixels is detected by a linear detector.

Referring to FIGS. 2, 2a, 3 and 4, a laser beam is transmitted from the scanning optical rangefinder through a laser transmitter channel as follows. A laser diode 10 or other intense source of radiation emits a beam of light which is shaped and redirected by laser output optics 12 to laser collimating mirror 14. Collimated light from laser collimating mirror 14 is directed onto dimple 18a of scan disc 20 in an annular area equal to the projection of the aperture of laser collimating mirror 14 onto the scan disc. After reflection from the dimple 18a the light is brought to a focus on strip mirror 22a at a large angle of incidence.

After reflection from strip mirror 22a, the light beam diverges and becomes incident on primary mirror 24a whereupon it is reflected and collimated. The collimated light then passes on to double sided, partially transmitting mirror 26 where it is split into a signal beam and a reference beam. The reference beam is transmitted through double sided mirror 26 to primary mirror 24b, while the signal beam undergoes a 90° change in direction, now traveling toward fold mirror 28a. After reflection from fold mirror 28a, the signal beam passes on toward the target after passing through window 54a of the laser transmitter channel.

Laser light reflected from the target is received through laser receiver channel window 54b, then reflected sequentially off fold mirror 50, vertical scan mirror 46b, fold mirror 28b, and double sided mirror 26 before being focused by primary mirror 24b onto strip mirror 22b. The reference beam is combined with the beam from the target at primary mirror 24b. The focused rays incident on the strip mirror are redirected 90 degrees and fall incident on dimple 18b which collimates the rays and directs them to collection mirror 30b, which in turn focuses the laser light onto linear detector array 40b with the assistance provided by field lens 42 and relays lens 44. Fold mirror 32b and combination mirror 34 are used together with fold mirror 52 to provide the packaging configuration shown in FIGS. 2–4.

Ideally mirror 30b would itself possess the very long focal length (750 mm) necessary to produce the required linear separation of focused light spots on the detector array to meet the range resolution requirement; however this condition is not readily obtainable in such a small package using a single focusing optical component. Instead, relay lens 44 is used in conjunction with collection mirror 30b to create a system equivalent focal length which is much longer than the optical path between 30b and detector 40b. Relay lens 44, relays image 36 formed by mirror 30b onto detector array 40b, and in so doing provides about five-fold magnification to the focal length of the collection mirror 30b. This results in the desired 750 mm system focal length. Relay lens 44 can take on various forms, a classical Cooke triplet being illustrated, as long as a flat field, an aberration-corrected image is delivered to detector array 40b.

Double sided mirror 26 is, by design, not 100% reflective. This mirror reflective coating deposited on a transparent substrate permits a small amount of laser light (2–3%) from the laser transmitter channel to leak through the mirror coating. After passing through the mirror coating this laser light sampling from the transmitter channel joins up with the laser light reflected from the target and both travel through the laser receiver channel together. For an infinite target, both beams will focus on the same element of detector array 40b. Near targets will create focused light spots which are linearly displaced along the array from the infinity target light spot by an amount which is inversely proportional to the target range.

The particular element of the array which corresponds to infinity range will vary to the extent that dimple 18a in the laser transmitter will not always be exactly diametrically opposite 18b in the laser receiver channel due to manufacturing errors in the dimple tangential locations. This difference will generally vary from one set of diametrically opposite dimples to the next.

The light spot on the array which corresponds to a near target at a particular range will also vary accordingly thereby creating an erroneous target range. This error is eliminated by taking the difference in the location between the infinity range light spot created by the sampled transmitter beam and the light spot from the return laser beam from a target at some near range. In other words, the infinity range light spot on the detector array is a "floating reference" which varies in accordance with dimple tangential location errors. This feature yields "true range parallax" and provides for the realization of an accurate, real world, small, low cost system.

In the image channel, natural light reflected or emitted from the target passes through window 54a and is then reflected sequentially off fold mirror 50, vertical scan mirror 46a, fold mirror 28a, and double sided mirror 26 before being focused by primary mirror 24a onto strip mirror 22a. The focused rays incident on the strip mirror are redirected 90 degrees and fall incident on dimple 18a. The dimple 18a collimates the rays and directs them to collection mirror 30a, which in turn focuses the light at image 36a, located at detector 40a. Suitable folds in the optical axis are provided by fold mirror 32a and combination mirror 34.

The image data collected can be in one or more spectrums including the infrared. This data can be used to enhance overall system rangefinding performance by allowing targets in the field which are not of interest to be filtered out using a suitable algorithm in the processor. This capability would be particularly useful in a scene in which many unwanted targets would be encountered and for which tracking from frame to frame would be a task that would overburden the processor due to the enormity of the data processing task.

In the scanning optical rangefinder illustrated, vertical direction scanning is achieved by rotation of vertical scan mirrors 46a and 46b about pivot 48 and the line of sight is restored to its original direction after reflection from fixed mirror 50. Vertical direction scanning may also be achieved by omitting vertical scan mirrors 46a and 46b and fixed mirror 50 and rotating the entire unit, i.e., housing 52, through the L required angle. Windows 54a, 54b and 55 provide a sealed interface between the outside world and the clean, dry internal environment. Vertical scan mirrors 46a and 46b are driven by vertical drive motor 56 and scan disc 20 is driven by scan disc drive motor 58. Electronics for the drive motors 56 and 58, timing circuitry and detector signal processing are housed in area 62 which contains the appropriate printed circuit boards and electronic components. Position encoders for vertical scan mirrors 46a and 46b and scan disc 20 are provided along with drive motor units 56 and 58. Electrical input power and video output data are transmitted via electrical connectors and/or direct wiring connections which can be suitably located for best overall package geometry for the particular application. Laser 10 is housed in laser module 64 which contains fins for dissipating the heat generated in driving the laser and which is heat sunk to the main housing of the scanning optical rangefinder.

As preferably embodied, the particular optical components required to assemble a scanning optical rangefinder in accordance with the invention are as follows:

| Component | Quantity | Specifications |
|---|---|---|
| Scan Disc | 1 | 54 mm dia (OD), 20 mm dia (ID). 10 dimples, sector shaped, 36° dimple focal length = 12.7 mm dimple contour, aspheric (hyperbola) |
| Primary Mirror | 2 | focal length = 19.0 mm, spherical surface aperture 21 × 44 mm |
| Strip Mirror | 2 | 38.1 mm dia × 1.0 mm thick 45° half angle, right circular cone active areas: 2 @ 10 mm (30°) combined in a single ring construction |
| Collection Mirror | 2 | 90 mm equivalent focal length, off-axis parabola clear aperture: sector 36°, $R_1$ = 10 mm, $R_2$ = 27 mm |
| Fold Mirrors | 2 | flat surface (R = ∞ clear aperture: 16 mm × 8 mm |
| Beam Combining Mirror | 1 | flat surfaces (2) clear aperture: each surface, 4 mm × 10 mm |
| Field Lens | 1 | double aspheric singlet or doublet with single aspheric surface focal length = 15 mm clear aperture: 4 mm × 12 mm |
| Relay Lens | 1 | three or four element flat field, wide angle lens operating at a magnification of 5.5x; focal length = 12.5 mm; nominal F/number at input F/6.5; output F/number = F/35. Field angle 50° |
| Fold Mirrors | 2 | integral with housing flat surfaces clear aperture: 85 mm × 22 mm on one, 85 mm × 45 mm on the other (due to second usage by relay lens) |
| Double Sided Mirror | 1 | partially transmitting (2–3%) at laser wavelength |

-continued

| Component | Quantity | Specifications |
|---|---|---|
| Laser Input Optics | 1 | flat surface<br>clear aperture: 40 × 22 mm<br>off axis parabola to collimate light while changing the direction of the line of sight<br>toroidal lens (optional) for shaping laser beam |

The particular optical specifications for the scanning optical rangefinder described herein are as follows:

(1) Afocal magnification, primary mirror and scan disc dimple:

$$M_{afoc} = \text{magnification}$$
$$= \frac{\text{Primary } EFL}{\text{Dimple } EFL}$$

where EFL is the equivalent focal length. Then, $$M_{afoc} = \frac{19.05 \text{ mm}}{12.7 \text{ mm}}$$
$$= 1.5$$

(2) System focal length, $f_{sys}$:

$$f_{sys} = (M_{afoc})(f_{col})(M_{relay})$$

where $f_{col}$ is the equivalent focal length of the collection mirror and $M_{relay}$ is the magnification of relay lens 44. Then, $$f_{sys} = (1.5)(90 \text{ mm})(5.555)$$
$$= 750 \text{ mm}$$

(3) Entrance Pupil—The entrance pupil is the sector-shaped projection of a scan disc dimple. The entrance pupil is enlarged over the size of the dimple by the afocal magnification factor.

$$\text{dimple area} = A_{dimple} = \frac{36°}{360°}[\pi(27)^2 - \pi(10)^2]$$
$$A_{dimple} = 197.6 \text{ mm}^2$$

equivalent circle diameter:

$$D_{equiv} = \frac{4}{\pi} A$$

equivalent entrance pupil circle =23.8 mm

The housing of the scanning optical rangefinder comprises two basic parts: a main housing and a cover plate. The main housing provides structural rigidity to maintain alignment of the optics and, as such, can be considered analogous to an optical bench. Material selection and component design are chosen to prevent warpage and any change in location of the optics internal to the housing.

The main housing can be either a machined casting or an injection molded unit. In either case, the required mounting bosses for the optics are preferably integrally formed with the main housing such that the required component alignment is achieved automatically upon insertion of the component into the housing.

If the housing is injection molded, optical quality surfaces can be achieved and components such as the fold mirrors 28a, 28b, 32a and 32b and primary mirrors 24a and 24b can be produced integral with the main housing thereby reducing component cost and assembly time. In this case, the main housing will be processed to provide the mirrors with a reflective coating. For applications where extremely low cost is not imperative, the mirrors can be diamond turned and then integrated with the housing or cover plate.

The mount for the strip mirrors 22a and 22b and the scan disc motor may also be integral with the main housing. The strip mirrors may be either a full ring or arc segments of a ring of sufficient span to cover the field of view without blocking the passing ray bundles as illustrated in FIG. 5.

The housing is effectively a two-level optical bench, one level defined by the plane of the strip mirrors 22a and 22b and the other level above it defined by the detector arrays 40a and 40b, relay lens 44 and mirrors 32a, 32b and 34. The components and their mounts are toleranced to keep the optical axis in the appropriate plane at all times except during the transfer between levels. The transfer between levels is accomplished with mirrors 30a, 30b, 32a and 32b. Double sided mirror 26 is located by a groove which is integral with or machined into the main housing. The double sided mirror in turn may be used to support the strip mirrors.

Figure 3:
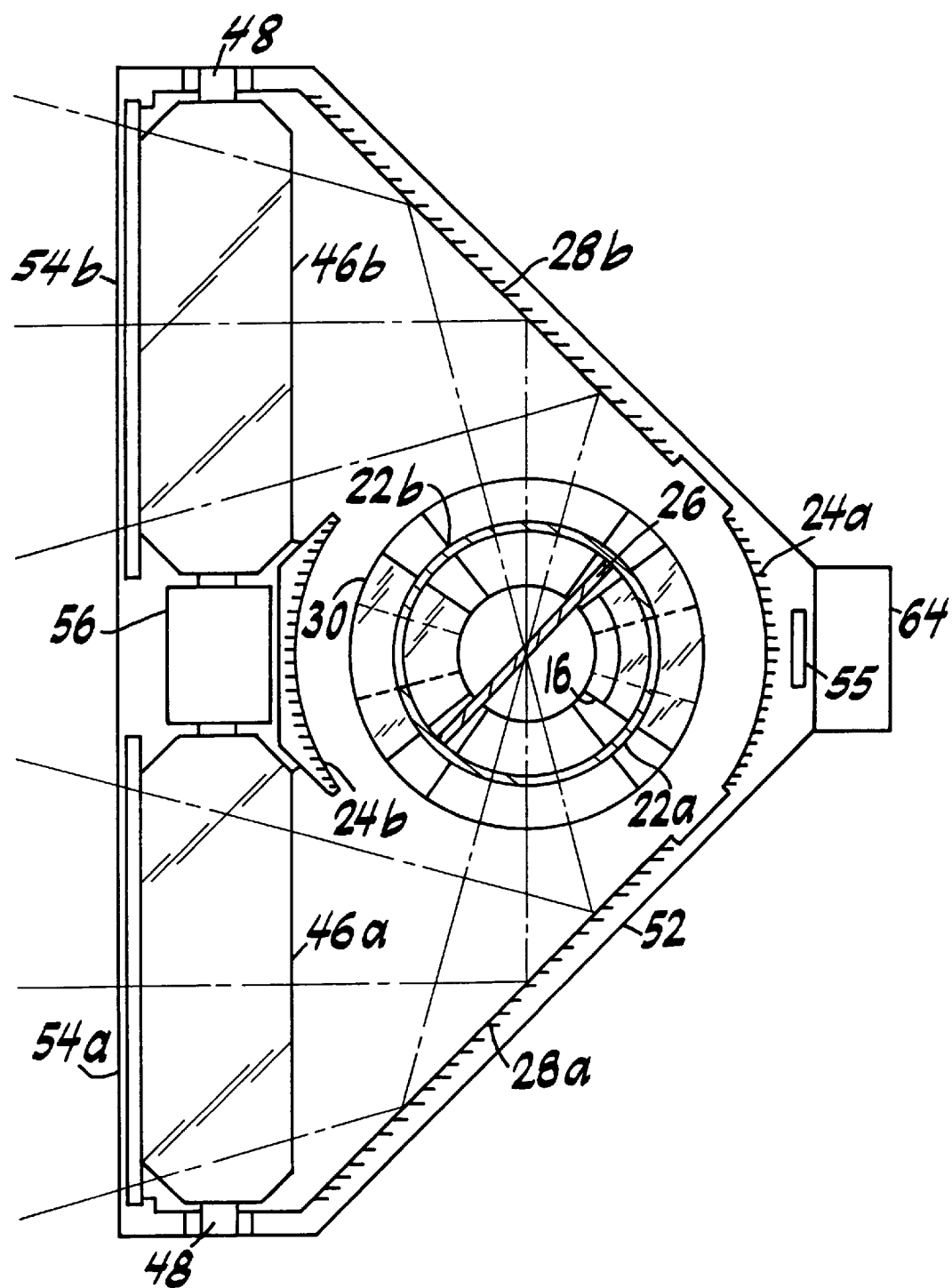
FIG. 3 is a plan view along line A—A of FIG. 2a of the lower level of the scanning optical rangefinder of FIG. 2.
Figure 4:
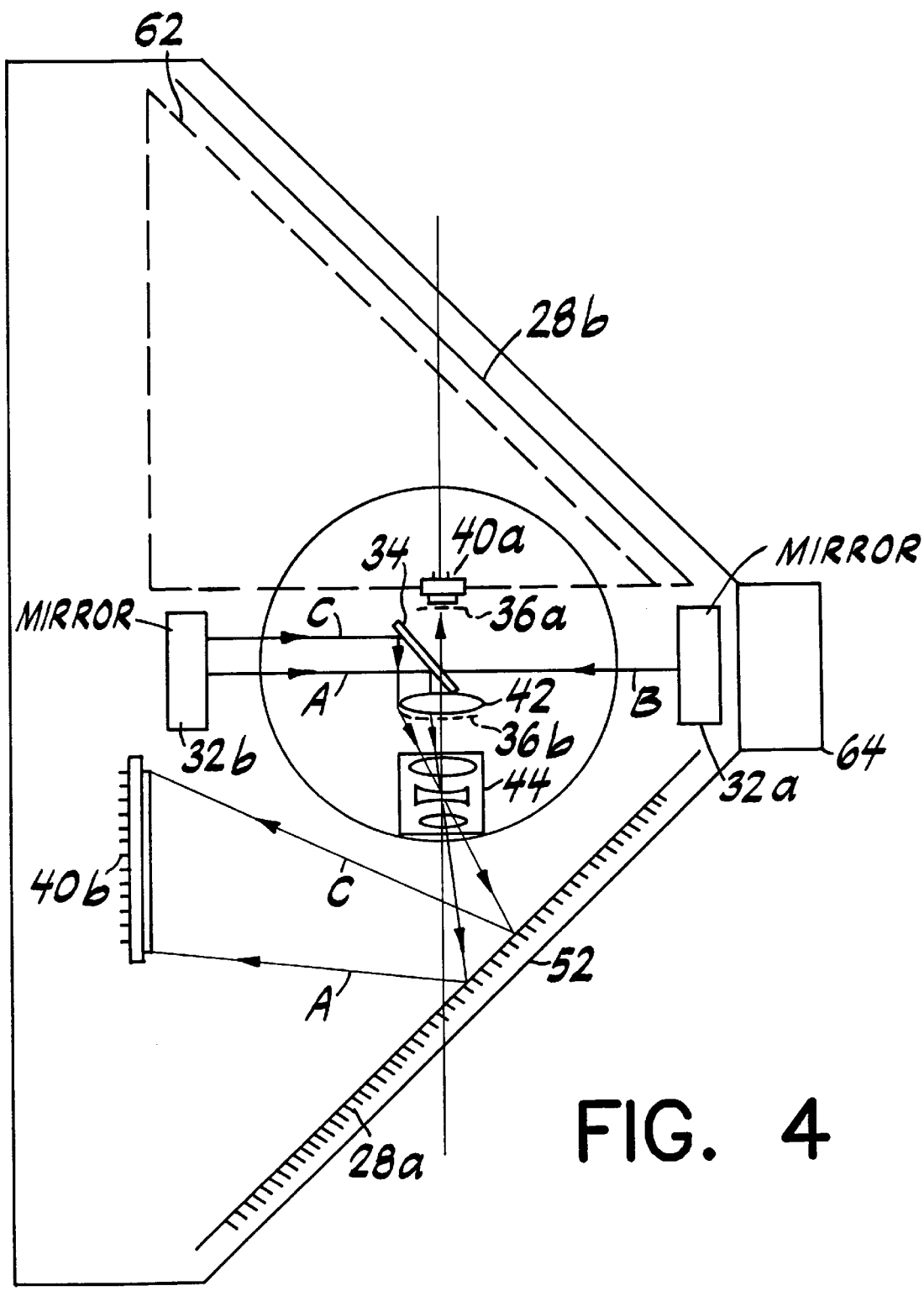
FIG. 4 is a plan view along line B—B of FIG. 2a of the upper level of the scanning optical rangefinder of FIG. 2.

The vertical scan mirrors 46a and 46b are supported at either end by conventional bushings or roller bearings. The vertical scan mirrors 46a and 46b are driven by a motor 56 which is centrally located, as shown in FIG. 3, or can be driven indirectly through a band drive with the motor located elsewhere. Alternatively, the vertical scan mirrors may be mechanically linked to the scan disc via a gear train allowing the use of a single drive motor.

The scanning optical rangefinder is sealed via an O-ring or the like between the main housing and cover plate. The windows 54a, 54b and 55 are "potted" into place with a suitable elastomeric type of cement.

It may be appreciated that the overall dimensions of the scanning optical rangefinder depend on the range resolution requirement and field of view. The higher the range resolution requirement, the larger the physical size since it is the distance between the two viewing points which determines the resolution. The larger the horizontal field of view, the larger the physical size also becomes since the field of view largely determines the fold mirror size, which correspondingly determines the width of the device. The entrance pupil size also determines the device size, in particular its height.

FIG. 5 illustrates the light bundles reflected from a target for the left and right read channels and how these bundles dictate the dimensions of the device. In this particular illustration, a 30° field and 20 mm ray bundle are shown.

For the scanning optical rangefinder described herein, the following constraints on physical size are applicable:

Width—185 mm
Length—125 mm
Height—55 mm
Horizontal Field of View—30°
Vertical Field of View—6°
Entrance Pupil—23.8 mm The primary functions of the scanning optical rangefinder electronics are to: a) drive vertical scan mirrors 46a and 46b and scan disc 20 such that the optical line of sight of the scanning optical rangefinder is swept over the horizontal and vertical fields of view at the required rate while remaining synchronized; b) provide the necessary input power and clocking signals for detector array 40b, detector 40a, and their associated electronics; c) perform signal processing of the output signals from the detector array including light centroid location on the array and threshold setting; d) format the output of the detector array to a form suitable for input to an image processor. A separate external electronic unit may be used to power the laser and to modulate it, if necessary.

The scan disc drive electronics maintain the speed of the scan disc constant via a closed loop circuit in which feedback data on the position of the scan disc is continuously sent to the motor drive electronics. Position information may be collected via an optical encoder located either on the scan disc motor shaft or on the back surface of the scan disc itself. Similar circuitry may be used for the vertical scan mirrors; however, the motor drive for the vertical scan mirrors produces an oscillatory motion rather than a continuous circular motion. Consequently, different approaches may be utilized in its drive, e.g., a limited angle or "sector motor". A continuous drive motor may be employed with a cam mechanism also, as a means for achieving the oscillatory vertical scan mirror motion.

Specifications for the scanning operation of the scanning optical rangefinder described herein are as follows:

Frame time—0.1 sec.
Lines/frame—12
Pixel size—0.50×0.5°
Vertical field of view—6.0°
Line scan time—0.1/12=0.00833 sec.
Horizontal field of view—30°
Pixels/line—60
Pixel scan time—0.00833/60=0.000139 sec.
Scan disc number of dimples—10
Time for single revolution of scan disc—10×0.00833= 0.0833 sec.
Scan disc speed =1/0.0833=12 rev/sec=720 rev/min
Scan disc number of dimples—10
Scan disc speed=1/0.0833=12 rev/sec=720 rev/min— therefore, scan disc motor speed=720 rev/min
Vertical scan mirror speed (assume unidirectional motor coupled to cam)=frame rate=1/frame time=1/0.1 sec =10/sec., therefore, motor speed=600 rev/min It may be noted that the closeness of the motor speeds for the scan disc drive and the vertical scan mirror drive suggests that the assumed system parameters may be adjusted such that the two speeds are identical. It is then possible to have a direct drive of a cam located on the vertical scan mirror shaft by the scan disc. This provides cost reduction by elimination of a separate motor for the vertical scan mirror.

All events in the scanning optical rangefinder are controlled in time by a master clock which emits a continuous flow of pulses at high frequency in the megahertz (MHz) range. The scan disc and the vertical scan mirror are synchronized to provide a continuous raster scan at a particular scan rate. The detector array is read out at each pixel in the raster scan in order to determine the range for that pixel. This operation may be synchronized by the master clock through the clocking pulses used to transfer the electronic data from one cell to the next within a CCD array. Thus, at any instant in time, the azimuth and elevation coordinates of the scanned laser beam can be determined and the range for the pixel with those coordinates can be determined as well.

The CCD clocking/readout rates may be determined as follows: time to readout one pixel=pixel scan time= 0.000139 sec. Assuming a CCD having 1750 elements; then time to read out one cell of the array $t_{CCD}$ is $$t_{CCD}=0.000139/1750=7.94\times10^{-8} \text{ sec.}$$

which indicates a readout rate of 12.6 MHz.

Taking into account the fact that scan efficiency will not be 100%, rather approximately 90% and 80% for the vertical and horizontal scans, respectively, the actual read out rates will be correspondingly faster:

CCD readout rate=12.6/(0.9×0.8)=17.5 MHz

This rate is within the capability of existing CCD's.

Some signal processing can be accomplished with electronic circuitry which either resides on a semiconductor chip containing the CCD detector arrays or elsewhere off the focal plane. Such circuitry is described in Dalsa, Inc., Waterloo, Onatrio, Canada, 1992 Handbook, "CCD Image Sensors and Cameras". Certain signal processing functions can be performed on the detector array chip, e.g., thresholding. In this case signals falling below a certain level are automatically rejected. Also, centroid locating may be implemented wherein the centroid of a light spot on the detector array which spans several detector elements can be found. This feature allows a resolution superior to that defined by a single element of the detector array, likely to be one-half or better. Other more sophisticated signal processing can be achieved with electronics residing on separate dedicated semiconductor chips located off of the focal plane. For example, certain atmospheric conditions including fog, rain or snow may produce spurious range returns. Processing algorithms built into dedicated chips may reject such extraneous signals and yield a true range return.

The data output from the signal processing electronics must be formatted suitable for input to an image processor such as are well known in the art. The formatting circuitry provides synchronization marks in the video train of data to designate the start-of-line and start-of-frame. These marks ready the image processor to receive a stream of data which yields range data as a function of time and, therefore, as a function of coordinates in object space.

Detector 40a is a single element detector which can have sensitivity typically in the 3.5u or 8.12u spectrum. Detector 40b is typically as described in the above-referenced Dalsa Handbook. Briefly, the device comprises a linear array of photosensitive diodes combined with a charge coupled device (CCD). Individual diodes are approximately 0.015 mm square and there will be some 1750 diodes along the detector array. The detector array length is approximately 26 mm.

The CCD device transfers the electrons generated by the photodiode to a CCD shift register for output via a transfer gate. The signal packets which reside mometarily in the shift register are "clocked out" as a signal data stream by application of a train of clocking pulses. This is typically a high speed operation at a 17.5 MHz rate.

Exposure control to prevent blooming of intense input light signals and to create thresholds may be obtained by application of suitable control voltages to the appropriate device input terminals.

It may be appreciated that basic requirements of the scanning optical rangefinder are that it be sensitive to low level photo inputs; that the individual elements be small; and that the device be fast enough to clock out the signals over a long span of detector array elements. The scanning optical rangefinder meets these requirements when the input light wavelength is near the wavelength of peak spectral sensitivity of the photodiode. This is the case when the input light is from a laser diode of the GaAlAs type which emits light at a nominal wavelength of 0.810 nanometers and when the photodiode photosensitive material is silicon, the type employed in the device described herein.

The photodiode/CCD detector array can also be designed to incorporate additional electronic functions, ordinarily performed in a separate additional electronic unit. These include location of the position of the light spot on the detector array, and dynamic range control as described above.

While the detector array described comprises square detector elements of uniform size along the length of the detector array it may be advantageous to depart from this configuration either to improve performance or to reduce the cost of manufacture. For example, if the transmitted laser beam is not circular but rather elliptical, the illuminated spot on the target will also have this shape. Correspondingly, the image of the target spot at the detector will also have that shape. Therefore, in order to capture all of the imaged light, the detector element should have a rectangular rather than a square shape. The rectangular detector element length should be oriented at a right angle to the length of the array as the long dimension of the beam should be oriented vertically.

Additionally, for near targets the small detector element size required for high range resolution of distant targets is not required. The detector element size may then increase progressively in width along the detector array as the distance from the first detector element increases. The spectral sensitivity of the detector element can be altered to selectively react to the laser wavelength by deposition of a suitable multilayer coating on the detector element.

A laser diode is the preferred source of radiation for illuminating the target due to the level of target irradiance achieved as compared to conventional light sources. A laser diode is preferred over a gas laser because of its small size. Laser diodes are available in a standard TO-3 package commonly used in packaging solid state electronics whereas a gas laser of equivalent power level would be at least an order of magnitude greater in volume and weight. Laser drive power may be provided external to the scanning optical rangefinder.

Laser diodes may be used in either a continuous or a pulsed manner. They are available at selected wavelengths from the visible spectrum up to and including the near IR spectrum. They are commonly made as GaAlAs devices lasing in the 780 to 870 mm region of the spectrum. GaAs devices are available which laze in the 910 to 980 mm range. In the visible band, AlGaInP devices are available, and more recently GaInAsSb devices emitting light in the mid-infrared band from 1700 to 5000 nm have become available.

The GaAlAs is well suited to silicon-type detectors because the wavelength emitted is near the peak spectral sensitivity of the detector, and both are commonly available. However, lasers operating in the 780–870 mm band are potentially harmful to the human eye as are those operating in the visible band, 400–700 mm. At wavelengths greater than 1,500 mm, the radiation is absorbed by the eye cornea, lens and vitreous humor and therefore will not damage the eye by coming to focus on the retina at very high irradiance. This is the preferred laser wavelengths where the transmitted laser power is at a level which can yield eye damage.

Eye damage risk may also be reduced by incorporating a low power, eye safe visual light emitting diode in the laser transmitting channel as a means of alerting people of a potential eye hazard if viewed for a long period of time at close proximity. This can be accomplished by introducing the beam from the LED into the laser beam with a dichroic beam splitter.

Laser diodes typically emit a fan of radiation which is 10°×30°. When collimated this yields a beam which is elliptical in cross section with a 3:1 aspect ratio. In many applications, this configuration is changed by application of beam shaping optics. In a CVROS scanner, however, a beam which is elliptical in cross section and having an aspect ratio of 3:1 is well suited for illuminating the dimple of the scan disc.

It may be appreciated that the fundamental objective of the scanning optical rangefinder is to scan a certain field of view, one pixel at a time, and determine the range information for that pixel. This function ideally may be accomplished for a wide range of targets including vehicles of all types, pedestrians, animals, roadway and foreign objects in the road when applied in a vehicle collision avoidance application. The scanning optical rangefinder may do this over very short and very long ranges and at a very high frame rates with high resolution in target position, both lateral position and range position.

The scanning optical rangefinder must also be capable of satisfying certain design constraints while meeting these objectives. The design constraints include:

a) small system size—the scanning optical rangefinder must be compact enough so as to not interfere with vehicle styling and to allow implementation in a vehicle environment where space is restricted;

b) low system cost—the scanning optical rangefinder must be readily manufacturable. Components must be inexpensive enough to permit a vehicle customer to be able to afford the additional cost of this collision avoidance device which integrates a wide variety and large number of components. These include optics, motors, electronic boards, detectors, a laser and various mechanical components;

c) component availability—the components of the scanning optical rangefinders must be manufacturable at low cost within a certain time frame. The facilities and equipment to manufacture the components at low cost must be realizable now and not depend on undeveloped technology;

d) system safety—the scanning optical rangefinder must not provide a hazard or annoyance to pedestrians, motorists, living beings or property in general;

e) wide range of operation—the scanning optical rangefinder should meet minimum performance standards independent of weather and atmospheric conditions; and f) data reliability—low false alarm rate must exist to maintain vehicle operator confidence and provide critical information in a timely manner without false indications often occurring.

The system objectives and design constraints described above are frequently at odds with each other and therefore require certain trade offs. For example, the size of the scanning optical rangefinder is closely related to the aperture size of the device. The maximum range performance of the scanning optical rangefinder is dependent on the radiant power incident on the detector, which in turn is dependent on the aperture size. This relationship between power received at the detector and the aperture size can be shown to be the following:

$$P_{det} = r \eta P_{las} D^2_{aper} T^2 / 4R^2 \qquad (4)$$

where $P_{det}$ = radiant power received at the detector
$P_{las}$ = radiant power output by the laser
T = transmission of scanner
η = power utilization efficiency laser r=target reflectivity R=range to the target $D_{aper}$=diameter of scanner aperture Thus, if the diameter of the aperture size is increased by a factor of 2, for example, then the power received at the detector is increased by a factor of 4. This increase in radiant power collected by the detector translates into a correspondingly greater signal to noise ratio at the output of the detector and a corresponding increase in range performance.

For the scanning optical rangefinders to make timely calculations on the closing rate of an approaching vehicle, the difference in range of the vehicle from one scan frame to the next must be accurately determined. It has been shown previously that the difference in range gives rise to a difference in viewing angle at the two viewing points of a rangefinder that employs the triangulation principle:

$$d\delta = W/R^2 \, dR$$

where $d\delta$=the difference in viewing angle at the two viewing points dR=the difference in range between a target at two different times W=separation between the two viewing points R=Range Thus, as the separation between the two viewing points is increased, the range resolution improved.

It may be appreciated from FIG. 5 that the overall width of the scanning optical rangefinder must be increased to accommodate wider fields of view. This is due to the spread of the beam of light and the distance between the point of divergence of the beam of light and the fold mirrors 28*a* and 28*b*—the greater the distance, the greater the "footprint" of the light spot on the fold mirrors—and the greater the footprint, the greater the mirror size and overall width of the device.

Equation (4) gives the relationship between the power received at the detector and the power transmitted by the laser. This is a direct relationship so that the range performance will increase by 2 if the laser power is doubled according to equation (4). The relationship between target reflectivity and power received at the detector is exactly the same. Therefore, to range on distant targets which exhibit low reflectivity, high laser power is required. Laser power level, however, cannot be raised without limit because of potential eye damage. Larger lasers required to generate larger radiant power output are also undesirable for reasons including large size, large power consumption, large cost and large heat dissipation problem. Since system range performance will degrade under poor atmospheric conditions, but can be restored by transmitting more laser power, the system "cost" of achieving long range performance under all weather conditions becomes apparent.

The greater the number of pixels within a given field of view, the more accurately the position of a target can be determined. Also, the greater the number of frames of data per transmit time, the more accurately the velocity and acceleration of the target will be known. However, the greater number of pixels per frame and the greater number of frames per second lead directly to a greater data rate flowing out of the detector array. This rate is limited by the bandwidth capability of the processing electronics. In particular, the readout of the CCD detector array must occur during the pixel dwell time of the detector, which becomes shorter as the number of pixels per frame increases and the number of frames per second increases. For the scanning optical rangefinder described herein, the number of pixels per frame and the frame rate, 720 pixels/frame and 10 frames second, respectively, are about one-half the limit of what can be achieved with the CCD detector array described. The data rate of this detector in the configuration of the embodiment of the invention described herein is of the order of 18 MHz. Future detectors will operate faster thereby allowing higher scan rates and pixel counts per frame without compromising other performance characteristics of the device.

A complete vehicle collision avoidance system comprises the subject scanning optical rangefinder, an image processor, a controller, an operator audio or visual information display and a brake actuator device. Of these, only the scanning optical rangefinder needs to be strategically located in the vehicle to ensure optimum system performance. The scanning optical rangefinder requires placement on the centerline of the vehicle. It can be externally mounted in the grill or styled into a hood, or it can be internally mounted on the dashboard or in the area of the rear view mirror on the roof with minimal styling modifications made in either case. The optimum position for a particular vehicle may be determined from a modeling exercise in which elevation, vertical field of view, and hill slope variables are taken into account.

The image processor and controller are electronic units, basically computers with suitable input/output ports. They can be integrated into the computer already in place in the vehicle design with suitable modifications. Operator information can be audio, visual or both with the devices integrated into the existing dashboard operator display. Brake actuators may be those now in place for anti-lock braking system.

Active imaging using the laser employed for the rangefinding function is also possible with suitable processing of the data to sort out differences in target reflectance versus signal strength received from more distant higher reflectance targets.

Advantageously, when suitably configured, the vertical mirror can be controlled to vary its excursion. This could be operator selectable or preferably automatic when road and traffic conditions indicate a change for improved system performance.

The scanning optical rangefinder described herein also has application in fields other than vehicle collision avoidance. Multiple units can be configured into an intelligent traffic controller located at busy intersections or temporarily located at traffic congestion areas. Multiple devices may be integrated to cover 360° in azimuth and 45° in elevation in the case of permanent installation at an intersection.

Since the traffic controller must analyze images which are occuring over 360° in azimuth and some 45° in elevation, an extremely large number of pixels are generated. Further the images are time varying. These facts combine to result in an enormous data processing task. The computing task may be within the cabability of advanced computers which can be located integrally with the controller on site. Alternately the data can be compressed and transmitted via wireless transmission or fiber optic transmission line to a central mainframe computer site. This central computing site would process the data, make decision on traffic control and return them to the site from which the data originated. Employing super computers or banks of computers, control of the traffic over many sites or even towns or cities would be possible. Real time imagery at any installation site would be operator selectable and viewable at a command center or police station.

It may be appreciated that an effective traffic control system must be capable of quickly analyzing a large number of targets within a field of view. Advantageously, the scanning optical rangefinder according to the invention can accommodate such processing requirements. Information on vehicles, pedestrians and other targets may be accumulated in pixel maps and analyzed at a speed high enough to provide meaningful assessment of traffic flow in each direction at an intersection.

As the system incorporates a computer, the traffic controller may continually process object data within its field of view and make decisions for stopping traffic, allowing pedestrian crossing, or the like. It would eliminate considerable fuel waste which occurs when vehicles must wait at traffic lights when there is no traffic flow in the cross direction and could issue special warnings to motorists when pedestrians are crossing. Such a system may also incorporate an imaging feature to record traffic violations and data on the violators such as license plate number.

Other applications of the scanning optical rangefinder include robotics for factory automation and space and military applications. Range information greatly eases the image processing task now performed with "smart systems" which employ images. The procedures currently employed to extract range information indirectly from a multiplicity of images require substantial computation time and the elimination of the range determination procedure would speed up the overall image processing function greatly.

While the invention has been described in its preferred embodiments, it is to be understood that the words which have been used are words of description, rather than limitation, and that changes may be made within the purview of the appended claims without departing from the true scope and spirit of the invention in its broader aspects.

What is claimed:

1. A scanning rangefinder, comprising:
    a radiation source;
    a scanning element;
    means for directing radiation from said radiation source towards said scanning element;
    means for directing radiation reflected from said scanning element towards a target;
    means for directing radiation from said target towards said scanning element along a plurality of channels;
    a detector adapted to receive radiation reflected from said scanning element along each of said channels; and
    means for error correction for parallax data from said detector;
    wherein radiation is directed along a channel laterally displaced from a channel receiving radiation.

2. A scanning rangefinder according to claim 1, wherein said scanning element is a CVROS scanner.

3. A scanning rangefinder according to claim 1, wherein said scanning element is a polygon scanner.

4. A scanning rangefinder according to claim 1, wherein said scanning element is a plurality of oscillating mirrors.

5. A scanning rangefinder according to claim 1, further comprising means for vertically scanning a field of view.

6. A scanning rangefinder according to claim 5, wherein said means for vertically scanning further comprises at least one rotatable mirror.

7. A scanning rangefinder according to claim 5, wherein said means for vertically scanning further comprises means for translating a housing of the scanning rangefinder.

8. A scanning rangefinder according to claim 1, wherein said radiation source is a laser.

9. A scanning rangefinder according to claim 8, wherein said laser is a GaAlAs laser diode.

10. A scanning rangefinder according to claim 1, wherein said radiation source illuminates each pixel in a field of view.

11. A scanning rangefinder according to claim 1, wherein the scanning rangefinder has at least two optical levels.

12. A scanning rangefinder according to claim 1, wherein said means for directing radiation from said target directs radiation along two channels.

13. A scanning rangefinder according to claim 12, wherein radiation directed from said radiation source to said target travels along one of the same channels as radiation directed from said target to said detector.

14. A scanning rangefinder according to claim 1, wherein said detector adapted to receive radiation reflected from said scanning element along each of said channels further comprises a single element detector and a detector array.

15. A scanning rangefinder according to claim 1, wherein said means for directing radiation from said radiation source further comprises at least one mirror.

16. A scanning rangefinder according to claim 1, wherein said means for directing radiation reflected from said scanning element further comprises at least one mirror.

17. A scanning rangefinder according to claim 1, wherein said means for directing radiation from said target further comprises at least one mirror.

18. A scanning rangefinder according to any one of claims 15, 16 or 17, wherein said at least one mirror is integrally formed with a housing of the scanning rangefinder.

19. A scanning rangefinder according to claim 1, further comprising a signal processor for determining target range and lateral position from a signal from said detector.

20. A scanning rangefinder according to claim 19, further comprising a signal processor for determining target reflectivity from a signal from said detector.

21. A scanning rangefinder according to claim 19, further comprising a signal processor for target imaging.

22. A scanning rangefinder according to claim 1, further comprising a signal processor for establishing a signal threshold for signals from said detector and for rejection of extraneous signals from said detector.

23. A scanning rangefinder according to claim 1, further comprising a signal processor for centroid location on said detector.

24. An optical scanner, comprising:
    a light source;
    a rotating scan disc including a circular array of scanning element on a planar surface thereof;
    means for directing light from said light source towards said scanning element;
    means for directing light reflected from said scanning element towards a target;
    means for directing light from said target towards said scanning element along a plurality of channels;
    a detector adapted to receive light reflected from said scanning element along each of said channels; and
    means for error correction for parallax data from said detector;
    wherein radiation is directed along a channel laterally displaced from a channel receiving radiation.

25. An optical scanner according to claim 24, further comprising means for vertically scanning a field of view.

26. An optical scanner according to claim 25, wherein said means for vertically scanning further comprises at least one rotatable mirror.

27. An optical scanner according to claim 25, wherein said means for vertically scanning further comprises means for translating a housing of the optical scanner.

28. An optical scanner according to claim 24, wherein said light source is a laser.

29. An optical scanner according to claim 28, wherein said laser is a GaAlAs laser diode.

30. An optical scanner according to claim 24, wherein said light source illuminates each pixel in a field of view.

31. An optical scanner according to claim 24, wherein the optical scanner has at least two optical levels.

32. An optical scanner according to claim 24, wherein said means for directing light from said target directs light along two channels.

33. An optical scanner according to claim 32, wherein light directed from said light source to said target travels along one of the same channels as light directed from said target to said detector.

34. An optical scanner according to claim 24, wherein said detector adapted to receive light reflected from said scanning element along each of said channels further comprises a single element detector and a detector array.

35. An optical scanner according to claim 24, wherein said means for directing light from said light source further comprises at least one mirror.

36. An optical scanner according to claim 24, wherein said means for directing light reflected from said scanning element further comprises at least one mirror.

37. An optical scanner according to claim 24, wherein said means for directing light from said target further comprises at least one mirror.

38. An optical scanner according to any one of claims 35, 36 or 37, wherein said at least one mirror is integrally formed with a housing of the optical scanner.

39. An optical scanner according to claim 24, further comprising a signal processor for determining target range and lateral position from a signal from said detector.

40. An optical scanner according to claim 39, further comprising a signal processor for determining target reflectivity from a signal from said detector.

41. An optical scanner according to claim 39, further comprising a signal processor for target imaging.

42. An optical scanner according to claim 20, further comprising a signal processor for establishing a signal threshold for signals from said detector and for rejection of extraneous signals from said detector.

43. An optical scanner according to claim 24, further comprising a signal processor for centroid location on said detector.

44. A collision avoidance system, comprising:
light source;
a rotating scan disc including a circular array of scanning element on a planar surface thereof;
means for directing radiation from said radiation source towards said scanning element;
means for directing radiation reflected from said scanning element towards a target;
means for directing radiation from said target towards said scanning element along a plurality of channels;
a detector adapted to receive radiation reflected from said scanning element along each of said channels; and
means for error correction for parallax data from said detector;
wherein said light source, said rotating scan disc, said means for directing light from said light source, said means for directing light reflected from said concave reflectors, said means for directing light from said target and said detector are mounted in a vehicle; and
wherein radiation is directed along a channel laterally displaced from a channel receiving radiation.

45. A collision avoidance system according to claim 44, further comprising means for vertically scanning a field of view.

46. A collision avoidance system according to claim 45, wherein said means for vertically scanning further comprises at least one rotatable mirror.

47. A collision avoidance system according to claim 45, wherein said means for vertically scanning further comprises means for translating a housing of the collision avoidance system.

48. A collision avoidance system according to claim 44, wherein said light source is a laser.

49. A collision avoidance system according to claim 48, wherein said laser is a GaAlAs laser diode.

50. A collision avoidance system according to claim 44, wherein the collision avoidance system has at least two optical levels.

51. A collision avoidance system according to claim 44, wherein said means for directing light from said target directs light along two channels.

52. A collision avoidance system according to claim 51, wherein light directed from said light source to said target travels along one of the same channels as light directed from said target to said detector.

53. A collision avoidance system according to claim 44, wherein said detector adapted to receive light reflected from said scanning element along each of said channels further comprises a single element detector and a detector array.

54. A collision avoidance system according to claim 44, wherein said means for directing light from said light source further comprises at least one mirror.

55. A collision avoidance system according to claim 44, wherein said means for directing light reflected from said scanning element further comprises at least one mirror.

56. A collision avoidance system according to claim 44, wherein said means for directing light from said target further comprise at least one mirror.

57. A collision avoidance system according to any one of claims 54, 55 or 56, wherein said at least one mirror is integrally formed with a housing of the collision avoidance system.

58. A collision avoidance system according to claim 44, further comprising a signal processor for determining target range and lateral position from a signal from said detector.

59. A collision avoidance system according to claim 58, further comprising a signal processor means for determining target reflectivity from a signal from said detector.

60. A collision avoidance system according to claim 58, further comprising a signal processor for target imaging.

61. A collision avoidance system according to claim 44, further comprising a signal processor for establishing a signal threshold for signals from said detector and for rejection of extraneous signals from said detector.

62. A collision avoidance system according to claim 44, further comprising a signal processor for centroid location on said detector.

63. A collision avoidance system according to any one of claims 59, 60, 61 or 62 wherein information from said detector is processed by a computer in said vehicle.

64. A collision avoidance system according to claim 44, wherein said means for directing light towards a target and said means for directing light from said target are mounted on the centerline of said vehicle.

65. A method of optical scanning, comprising the steps of:
directing light from a light source towards a concave reflector on a rotating scan disc;
directing light reflected from said concave reflector towards a target;

directing light from said target towards scanning element on said scan disc along a plurality of channels;

detecting light reflected from said scanning element along each of said channels; and correcting errors in parallax data from detected light;

wherein radiation is directed along a channel laterally displaced from a channel receiving radiation.

66. The method of optical scanning according to claim 65, further comprising the step of vertically scanning a field of view.

67. The method of optical scanning according to claim 65, further comprising the step of providing a laser as said light source.

68. The method of optical scanning according to claim 65, further comprising the step of directing light from said target along at least two optical levels.

69. The method of optical scanning according to claim 65, further comprising the step of directing light from said target along two channels.

70. The method of optical scanning according to claim 69, further comprising the step of directing light from said light source to said target and at least some light from said target along the same channel.

71. The method optical scanning according to claim 65, further comprising the step of using mirrors integrally formed with a housing to direct light.

72. The method of optical scanning according to claim 65, further comprising the step of determining the range and lateral position of said target.

73. The method of optical scanning according to claim 72, further comprising the step of determining the reflectivity of said target.

74. The method of optical scanning according to claim 72, further comprising the step of imaging said target.

75. The method of optical scanning according to claim 65, further comprising the step of locating the centroid of light reflected from said target.

76. The method of optical scanning according to any one of claims 72, 73, 74 or 75, further comprising the step of processing information from said detected light by a computer in a vehicle.

* * * * *